(12) United States Patent
Raszkowski

(10) Patent No.: US 7,832,298 B2
(45) Date of Patent: Nov. 16, 2010

(54) COUNTERSHAFT CLUTCH AND GEAR ASSEMBLY

(75) Inventor: James A. Raszkowski, Indianapolis, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 672 days.

(21) Appl. No.: 11/780,313

(22) Filed: Jul. 19, 2007

(65) Prior Publication Data

US 2009/0019959 A1 Jan. 22, 2009

(51) Int. Cl.
*F16H 3/093* (2006.01)

(52) U.S. Cl. .......................................... 74/329; 74/331

(58) Field of Classification Search .................... 74/329, 74/331, 339, 340; 192/85.25, 48.603, 48.9
See application file for complete search history.

(56) References Cited

U.S. PATENT DOCUMENTS

| | | | | |
|---|---|---|---|---|
| 6,446,774 B2* | 9/2002 | Porter | ........................ | 192/35 |
| 2002/0104397 A1* | 8/2002 | Bowen | ........................ | 74/329 |

* cited by examiner

*Primary Examiner*—Sherry L Estremsky
*Assistant Examiner*—Edwin A. Young

(57) ABSTRACT

A low inertia clutch and gear assembly for disposition on a countershaft of a dual clutch automatic transmission (DCT) includes a gear which is in constant mesh with a gear secured to the input shaft of the transmission and which is freely rotatably disposed on one of the countershafts or lay shafts. The lower inertia components of the clutch, i.e., the clutch hub and the smaller diameter friction plates are secured to the countershaft whereas the higher inertia components, i.e., the clutch housing, the larger diameter friction plates, the reaction plate, the piston and the return springs, rotate with the gear.

17 Claims, 2 Drawing Sheets

COUNTERSHAFT CLUTCH AND GEAR ASSEMBLY

FIELD

Figure 1:
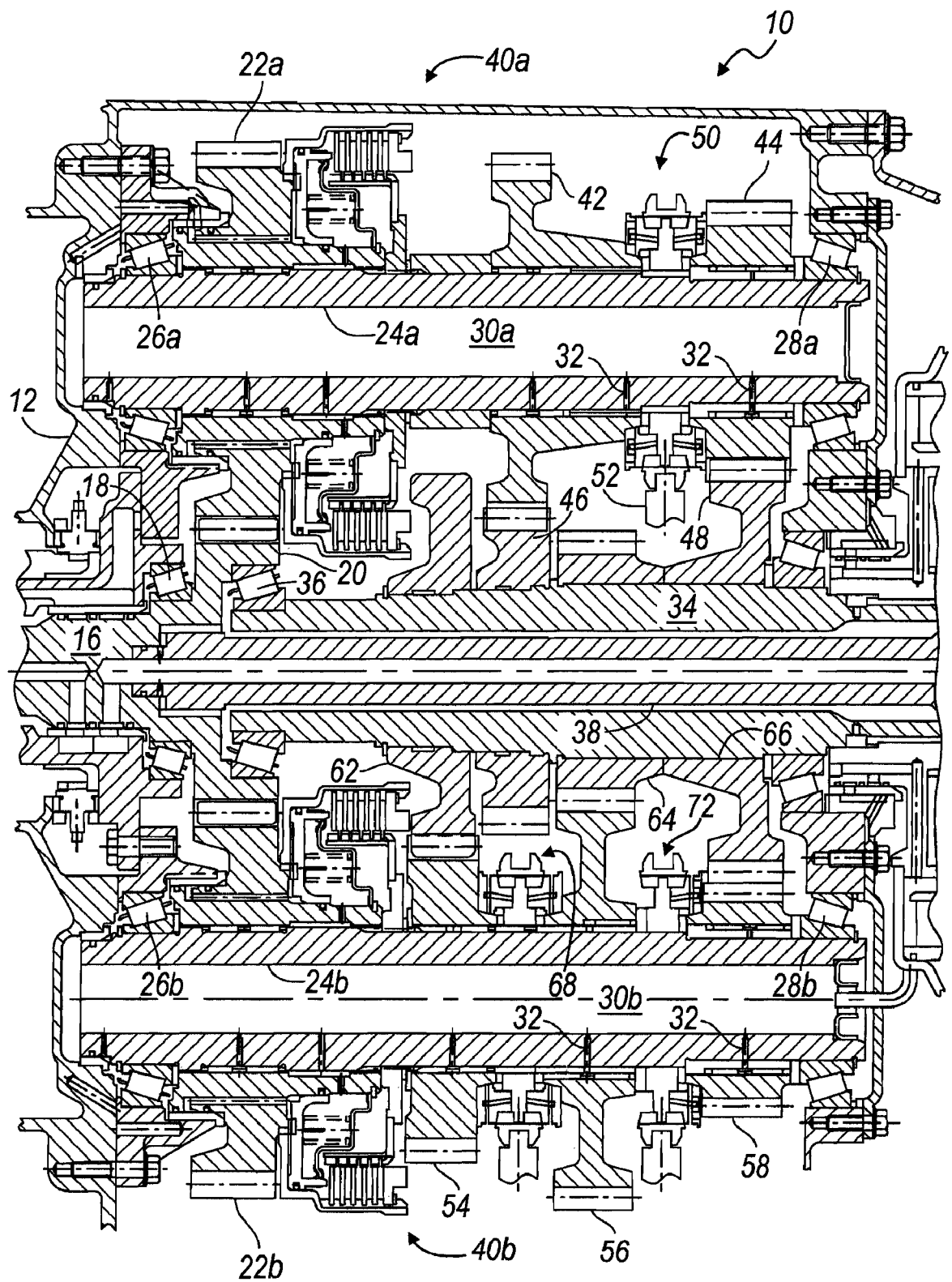

The present disclosure relates to a clutch and gear assembly and more particularly to a low inertia clutch and gear assembly for use on a countershaft in a dual clutch automatic transmission.

BACKGROUND

The statements in this section merely provide background information related to the present disclosure and may or may not constitute prior art.

A relatively new type of automatic transmission is referred to as a dual countershaft or dual clutch transmission (DCT). In a dual countershaft transmission, a pair of countershafts or lay shafts are disposed on opposite sides of the common axis of the input shaft and output shaft and in the same plane. Typical dual countershaft transmissions are split torque devices in which both countershafts carry load. This, as noted, requires the shafts to be in the same plane.

In other dual countershaft transmission configurations, only one countershaft carries load at a time. The countershafts can be located anywhere around the output shaft providing they do not interfere and provided there is room for the reverse idler. The countershafts are mutually exclusively driven by engagement of one of a pair of range clutches operably disposed between the input shaft and a respective one of the countershafts. A plurality of gears are secured to and rotate with the output shaft and each output shaft gear is in constant mesh with a one of a plurality of gears freely rotatably supported on the countershafts. Synchronizers and clutches selectively engage a single gear with its associated countershaft and the countershaft range clutch is then engaged to transmit torque from the input shaft to the output shaft.

In order to provide smooth and responsive gear shifts, the synchronizer must quickly adjust the speed of the countershaft to that of the selected gear so that a positive, e.g., dog, clutch can be fully engaged before the range clutch is engaged. If the range clutch engages before the countershaft speed is fully synchronized and the positive clutch is engaged, the engine to drive wheel connection would be lost and synchronizer damage would occur. Accordingly, the synchronizer must act quickly to facilitate engagement of the positive clutch. One of the factors affecting synchronizing time is the mass or inertia of the components to be synchronized.

The mass of the countershaft and that of all components rotating with it has been the object of much attention. For example, the countershaft is hollow in order to both reduce its mass and locate the metal that remains in a relatively thin wall, where it can carry the maximum load and torque. The benefits of this approach suggest that further effort to reduce the mass of the countershaft and its associated components would be worthwhile and this invention is the result of such effort.

SUMMARY

The present invention provides a low inertia range clutch and gear assembly for disposition on a countershaft of a dual clutch automatic transmission (DCT). The assembly includes a gear which is in constant mesh with a gear secured to and/or driven by the input shaft of the transmission and which is freely rotatably disposed on one of the countershafts or lay shafts. Fewer, lower mass or inertia components of the clutch, i.e., the clutch hub and the smaller friction plates are secured to the countershaft whereas more, higher mass or inertia components, i.e., the clutch housing, the larger friction plates, the backing plate, the piston and the return spring, are all mounted on and rotate with the gear. The gear also includes a plurality of passages which direct a flow of pressurized hydraulic fluid to the clutch piston. This configuration not only simplifies manufacturing of the countershaft but also improves the centrifugal balance of the piston.

When a gear shift is commanded, a synchronizer is activated to synchronize the speed of the countershaft with that of the selected gear which is in constant mesh with a gear secured to and rotating with the output shaft. A transmission having a range clutch configuration according to the present invention exhibits reduced inertia and thus the countershaft synchronizes more quickly allowing the range clutch to be engaged more guickly and reduce the likelihood of a shift induced transient in the powertrain.

It is thus an object of the present invention to provide a clutch and gear assembly for a dual clutch automatic transmission.

It is a further object of the present invention to provide a clutch and gear assembly for a dual clutch transmission having reduced mass rotating with a countershaft.

It is a still further object of the present invention to provide a range clutch and gear assembly for a dual clutch transmission having reduced mass rotating with a countershaft.

It is a still further object of the present invention to provide a range clutch and gear assembly for a dual clutch transmission having fewer, lower mass components of the range clutch rotating with a countershaft and more, higher mass components of the range clutch rotating with a range gear.

Further advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
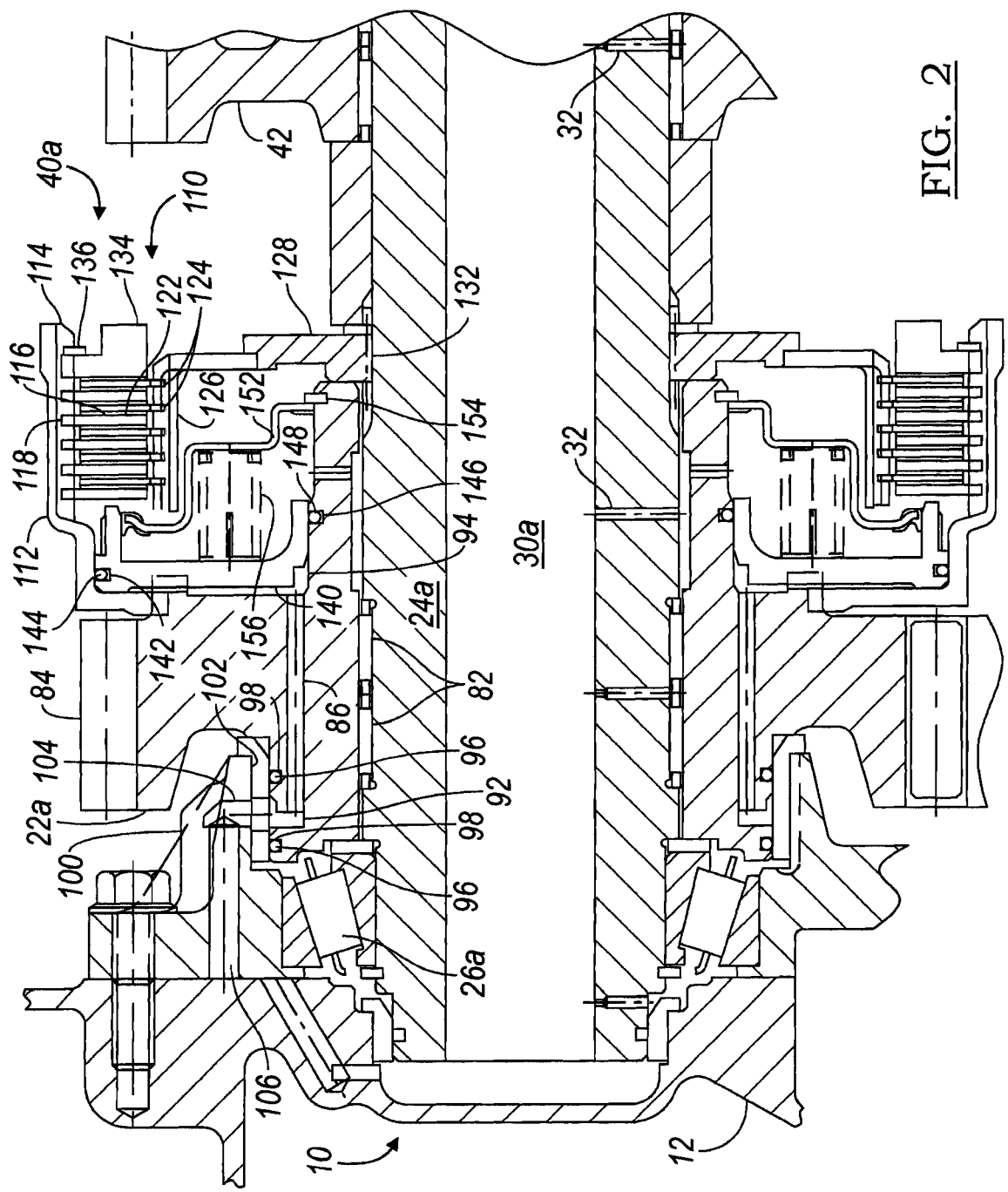

FIG. 1 is a full sectional view of a portion of a dual clutch transmission incorporating the present invention; and FIG. 2 is an enlarged, fragmentary sectional view of a range clutch and gear assembly according to the present invention in a dual clutch transmission.

DETAILED DESCRIPTION

The following description is merely exemplary in nature and is not intended to limit the present disclosure, application, or uses.

With reference to FIG. 1, a portion of a dual clutch transmission (DCT) is illustrated and generally designated by the reference number 10. The dual clutch transmission 10 includes a preferably cast metal housing 12 having various openings, ports, counterbores, shoulders, flanges and other features which receive, support and position the diverse components of the transmission 10. For example an input shaft 16 which is driven by the output of a torque converter (not illustrated) is rotatably supported on a tapered roller bearing assembly 18 and includes an input drive gear 20. The input drive gear 20 is in constant mesh with a pair of countershaft drive gears, a first countershaft drive gear 22A and a second countershaft drive gear 22B. Both of the countershaft drive gears 22A and 22B are freely rotatably disposed upon a respective pair of countershafts: a first lay shaft or countershaft 24A and a second lay shaft or countershaft 24B. The forward end of the first countershaft 24A is rotatably supported by a first tapered roller bearing assembly 26A and the forward end of the second countershaft 24B is rotatably supported by a second tapered roller bearing assembly 26B. The opposite (rear) end of the countershaft 24A is rotatably supported by a respective third tapered roller bearing assembly 28A and the opposite end of the second countershaft 24B is rotatably supported by a fourth tapered roller bearing assembly 28B. Preferably, the countershafts 24A and 24B are hollow and define axial lubrication passageways 30A and 30B, respectively, which communicate with a plurality of radial passageways 32

A hollow output shaft or quill 34 is disposed coaxially with the input shaft 16 and is rotatably supported therein at one end by a tapered roller bearing assembly 36. The hollow output shaft or quill 34 receives a drive shaft 38 which is coupled to and driven by the input shaft 16 and directly drives a high/low splitter (not illustrated). The output of the high/low splitter drives a prop shaft (not illustrated) typically through a universal joint or other connection (also not illustrated). The high/low splitter is optional, however, and may be eliminated in which case the drive shaft 38 may be selectively clutched directly to the output of the transmission 10 to provide a direct, i.e., 1:1, drive ratio.

Coaxially disposed about the first countershaft 24A is a first clutch and gear assembly 40A according to the present invention. Also coaxially disposed about the first countershaft 24A are a pair of gears 42 and 44 of distinct pitch diameters. The gears 42 and 44 as well as the other gears disposed on the countershafts 24A and 24B may be helical or spur gears. The gears 42 and 44 are freely rotatably disposed on the first countershaft 24A and are in constant mesh with a respective pair of gears 46 and 48 coupled to and rotating with the output shaft 34. The gears 42 and 46 and the gears 44 and 48 provide two distinct torque or speed ratios between the first countershaft 24A and the output shaft 34. A first synchronizer and clutch assembly 50 includes a shift fork 52 that is bi-directionally translated by an actuator (not illustrated). The first synchronizer and clutch assembly 50 is illustrated in a neutral or disengaged position and may be translated to the left to synchronize the speed of the countershaft 24A to the speed of the gear 42 and positively couple it thereto or moved to the right to synchronize the speed of the countershaft 24A to the speed of the gear 44 and positively couple it thereto.

It will be appreciated that the second countershaft 24B includes a second clutch and gear assembly 40B which is in all respects the same as the first clutch and gear assembly 40A which will be described below as well as three additional gears 54, 56 and 58 which are freely rotatably disposed about the second countershaft 24B. Two of the three additional gears 54 and 56 are in constant mesh with two respective gears 62 and 64 which are coupled to and rotate with the output shaft 34. The two additional pairs of gears 54 and 62 and 56 and 64 provide two more forward torque or speed ratios. The third additional gear 58 is in constant mesh with an idler gear (not illustrated) which is, in turn, in constant mesh with a gear 66 which is coupled to and rotates with the output shaft 34. The third additional gear 58, the idler gear and the gear 66 provide reverse. A second synchronizer and clutch assembly 68 selectively synchronizes and couples the gears 54 and 56 to the second countershaft 24B and a third synchronizer and clutch assembly 72 synchronizes and couples the third gear 58 to the second countershaft 24B.

Turning now to FIG. 2, the first clutch and gear assembly 40A will be described, it being understood that the first clutch and gear assembly 40A is the same as and functions the same as the second clutch and gear assembly 40B associated with the second countershaft 24B which will therefore not be specifically described. The first clutch and gear assembly 40A includes the first countershaft drive gear 22A which is preferably supported for rotation on the first countershaft 24A by a roller bearing assembly 82. The first drive gear 22A includes gear teeth 84 about its periphery and a plurality of axial fluid passageways 86 extending from one face of the first drive gear 22A to the other and preferably arranged concentrically about the axis of the first drive gear 22A and the first countershaft 24A. The axial fluid passageways 86 communicate at one end with a continuous circumferential groove or channel 92 and at the other with an annular cylinder 94. The circumferential groove or channel 92 is flanked by a pair of shallow grooves or channels 96 which each receive a rotating seal 98.

The transmission housing 12 includes an annular projection or flange 100 disposed concentrically about the axis of the first drive gear 22A and the first countershaft 24A. The projection or flange 100 supports and positions a stationary annular sleeve 102 which is in sealing contact with the rotating seals 98. Between the axially spaced-apart circular lines of contact of the rotating seals 98 on the annular sleeve 102 are one or more ports 104 which supply pressurized hydraulic fluid to the annular groove or channel 92 from a passageway 106 which communicates with a source of hydraulic fluid (not illustrated).

A clutch assembly 110 includes a bell-shaped circular housing 112 which is secured to the first drive gear 22A by, for example, welding or other positive means which provides a fluid tight seal between the first drive gear 22A and the circular housing 112. The bell-shaped circular housing 112 includes internal or female splines 114 which engage and drive a first plurality of larger diameter friction clutch plates or discs 116 having complementarily configured external or male splines 118 about their peripheries. The first plurality of friction clutch plates or discs 116 are interleaved with a second plurality of smaller diameter clutch plates or discs 122 having internal or female splines 124. Preferably, the surface of one of the contacting faces of each of the clutch plates or discs 116 and 122 includes friction facing material (not illustrated). The internal or female splines 124 engage complementarily configured external or male splines 126 disposed on a clutch hub 128 which is coupled to the first countershaft 24A by a set of interengaging splines 132 and rotates therewith. An annular reaction or backing plate 134 is retained in the bell-shaped housing 112 by a snap ring 136 and functions as a stop against which the clutch plates or discs 116 and 122 are compressed.

The first drive gear 22A and a portion of the bell-shaped housing 112 cooperatively form and define the annular cylinder 94 which slidingly receives an annular piston 140. The annular piston 140 includes a first outer circumferential channel or groove 142 which receives a first fluid tight seal 144 and the first drive gear 22A includes a second circumferential channel or groove 146 which receives a second fluid tight seal 148. Together the fluid tight seals 144 and 148 provide a sliding, fluid tight seal between the annular piston 140, the first drive gear 22A and the bell-shaped housing 112 and facilitate axial translation of the annular piston 140. A stepped annular balance piston 152 resides between the piston 140 and the clutch hub 128 and is retained in position by a snap ring 154. A plurality of compression springs 156 are disposed between the annular piston 140 and the stepped annular balance piston 152 and function as return springs to translate the annular piston 140 axially to the left in FIG. 2 when hydraulic fluid pressure is not present in the annular cylinder 94. Other spring configurations such as a Belleville spring or wave washers may be utilized in place of the plurality of compression springs 156.

It will be appreciated that the configuration of the first clutch and gear assembly 40A, specifically locating the clutch housing 112, the first plurality of larger clutch discs 116, the reaction plate 134, the piston 140, the balance piston 152 and the return spring 156 on the first drive gear 22A for rotation therewith while locating only the remaining second plurality of smaller clutch discs 122 and the clutch hub 128 on the first countershaft 24A for rotation therewith, reduces the mass and inertia of the components that must be synchronized during a gear shift and therefore reduces the synchronization time.

Furthermore, incorporating the hydraulic fluid passageways 86 in the first drive gear 22A significantly improves the centrifugal balance of the annular piston 140 by introducing the hydraulic fluid to the rotating assembly at a larger radius than if the fluid was supplied through the first countershaft 24A. This improved balance allows loads on the compression springs 156 to be lowered which, in turn, reduces the stress on other clutch components and improves the capacity of the clutch assembly 110. Locating the hydraulic fluid passageways 86 in the first drive gear 22A also simplifies and therefore reduces the manufacturing cost of the countershafts 24A and 24B by eliminating the hydraulic fluid feed passageways in these components.

The description of the invention is merely exemplary in nature and variations that do not depart from the gist of the invention are intended to be within the scope of the invention. Such variations are not to be regarded as a departure from the spirit and scope of the invention.

What is claimed is:

1. A clutch and gear assembly comprising:
    a countershaft,
    an input gear rotatably disposed on said countershaft,
    a clutch operably disposed between said input gear and said countershaft, said clutch including a housing, a piston, a cylinder for receiving said piston, a first plurality of friction discs and a reaction plate, said housing, said piston, said first friction discs and said reaction plate disposed for rotation with said gear and a second plurality of friction discs and a hub disposed for rotation with said countershaft; and
    wherein said gear includes a plurality of axial fluid passageways in communication with said cylinder.

2. The clutch and gear assembly of claim 1 wherein said first plurality of friction discs are interleaved with said second plurality of friction discs.

3. The clutch and gear assembly of claim 1 wherein said pluralities of friction discs include friction material.

4. The clutch and gear assembly of claim 1 further including a stationary member defining a fluid passageway adjacent said gear and a fluid seal between said stationary member and said gear.

5. The clutch and gear assembly of claim 1 further including at least one piston return spring disposed for rotation with said gear.

6. The clutch and gear assembly of claim 1 wherein said hub is coupled to said countershaft by interengaging splines.

7. A clutch and gear assembly for a countershaft of a dual clutch transmission comprising:
    a transmission countershaft,
    an input gear freely rotatably disposed on said countershaft,
    a clutch operably disposed between said input gear and said countershaft, said clutch including an annular housing, an annular piston, an annular cylinder for receiving said piston, a first plurality of clutch plates disposed in said housing and a backing plate, said housing, said piston, said first clutch plates and said backing plate disposed for rotation with said gear and a second plurality of clutch plates and a hub disposed for rotation with said countershaft; and
    wherein said gear includes a plurality of axial fluid passageways in communication with said annular cylinder.

8. The clutch and gear assembly of claim 7 further including a stationary member defining a fluid passageway adjacent said gear and a fluid seal between said stationary member and said gear.

9. The clutch and gear assembly of claim 7 further including at least one piston return spring disposed for rotation with said gear.

10. The clutch and gear assembly of claim 7 wherein said first plurality of clutch plates are interleaved with said second plurality of clutch plates.

11. The clutch and gear assembly of claim 7 wherein said pluralities of clutch plates include friction material.

12. The clutch and gear assembly of claim 7 wherein said hub is coupled to said countershaft by interengaging splines.

13. A clutch, gear and countershaft assembly for a dual clutch transmission comprising, in combination,
    a transmission countershaft,
    a driven input gear rotatably disposed on said countershaft,
    a clutch assembly including an annular housing, an annular piston, an annular cylinder for receiving said piston, a first plurality of clutch discs engaging said housing and a reaction plate, said housing, said piston, said first clutch discs and said reaction plate disposed for rotation with said gear and a hub and a second plurality of clutch plates engaging said hub and disposed for rotation with said countershaft; and
    wherein said gear includes a plurality of axial fluid passageways in communication with said annular cylinder.

14. The clutch, gear and countershaft assembly of claim 13 further including a pair of gears rotatably disposed on said countershaft and a synchronizer and a second clutch assembly operably disposed between said pair of gears and said countershaft.

15. The clutch, gear and countershaft assembly of claim 13 wherein said first plurality of clutch discs are interleaved with said second plurality of clutch discs.

16. The clutch, gear and countershaft assembly of claim 13 wherein said hub is coupled to said countershaft by sets of interengaging splines.

17. The clutch, gear and countershaft assembly of claim 13 including a stationary member defining a fluid passageway adjacent said driven input gear and a fluid seal between said stationary member and said driven input gear.

* * * * *